United States Patent [19]

Wagner

[11] 4,325,988
[45] Apr. 20, 1982

[54] DEPOSITION OF COATINGS FROM FINE POWDER REACTANTS

[75] Inventor: William E. Wagner, Verona, Pa.

[73] Assignee: PPG Industries, Inc., Pittsburgh, Pa.

[21] Appl. No.: 176,323

[22] Filed: Aug. 8, 1980

[51] Int. Cl.³ .............................................. C03C 17/23
[52] U.S. Cl. .................................. 427/160; 65/60.52;
427/164; 427/168; 427/180
[58] Field of Search ............... 427/110, 160, 164, 168,
427/180; 65/60 D, 60.52

[56] References Cited

U.S. PATENT DOCUMENTS

| | | | |
|---|---|---|---|
| 3,660,061 | 5/1972 | Donley et al. | 65/32 |
| 3,852,098 | 12/1974 | Bloss et al. | 117/106 |
| 4,172,159 | 10/1979 | Marcault | 427/110 X |
| 4,182,783 | 1/1980 | Henery | 427/248 |
| 4,230,271 | 10/1980 | Marcault | 118/308 X |

Primary Examiner—James R. Hoffman
Attorney, Agent, or Firm—Donna L. Seidel

[57] ABSTRACT

A method and apparatus are disclosed for producing a film on a substrate surface from a cloud of dust-sized particles of a coating reactant.

8 Claims, 1 Drawing Figure

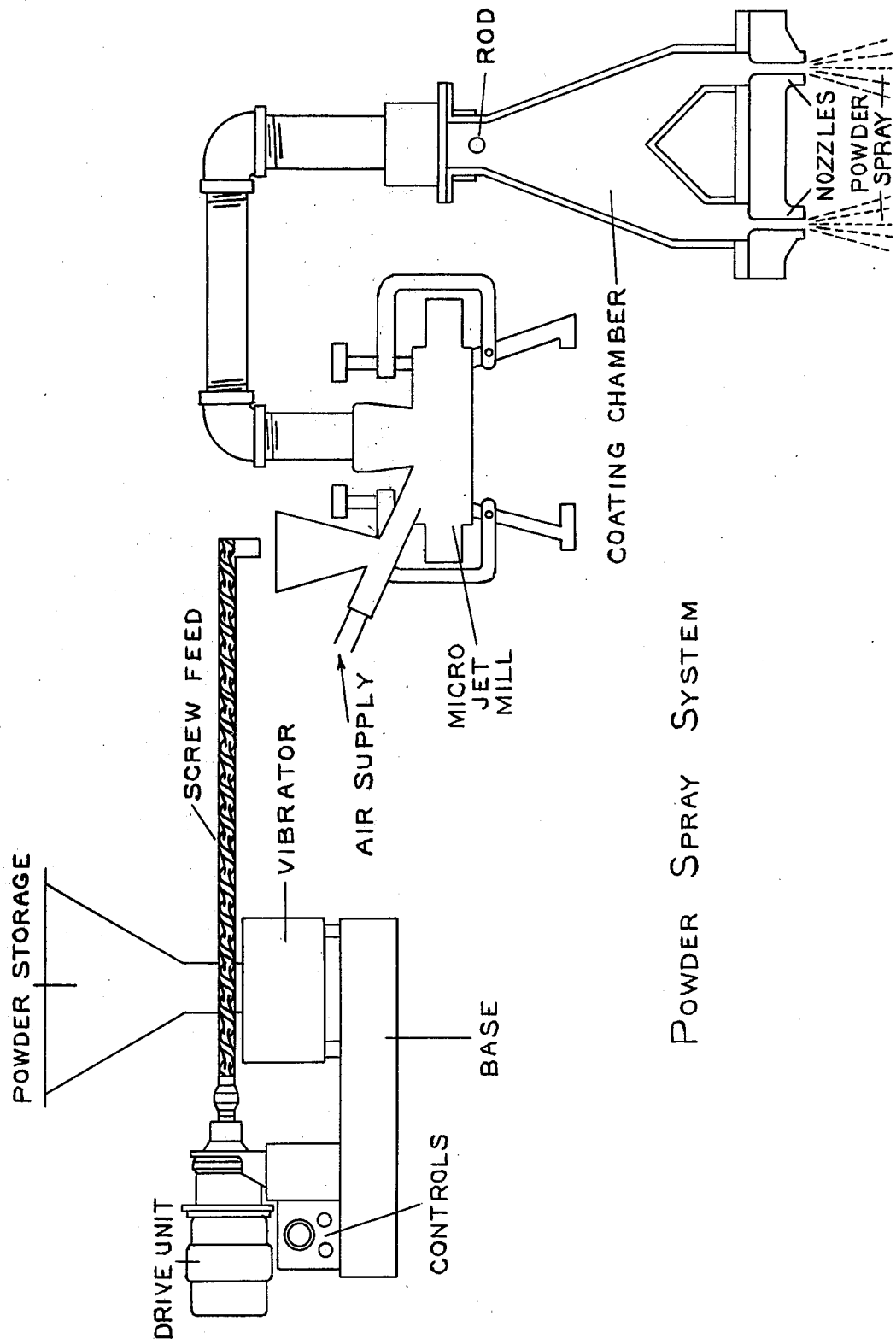

DEPOSITION OF COATINGS FROM FINE POWDER REACTANTS

BACKGROUND OF THE INVENTION

1. Field of the Invention

The present invention relates generally to the art of coating and more particularly to the art of using powder coating reactants.

2. The Prior Art

Various methods of coating glass with metal or metal oxide films are well-known in the art. A technique for depositing a variety of metal oxide films onto a hot glass surface in a continuous float glass ribbon environment is described in U.S. Pat. No. 3,660,061 to Donley et al. A mixture of organometallic compounds in organic solution is sprayed onto a glass surface at a temperature high enough for thermal reaction of the organometals to form a metal oxide film. This technique produces durable metal oxide films having desirable aesthetic and solar energy control properties. Although the use of large volumes of solvent results in rapid cooling of the glass, more significant disadvantages are the health, safety and environmental effects of the use of large volumes of organic solvents.

These disadvantages may be abated by elimination of the organic solvent. A method for solventless chemical vapor deposition of coatings from vaporized powder coating reactants is described in U.S. Pat. No. 3,852,098 to Bloss et al. A powder coating reactant is dispersed into a hot stream of gas, vaporized, and conveyed to the surface to be coated, which is maintained at or above the temperature at which the coating reactant pyrolyzes to deposit a film. Although the disadvantages of a solvent system are avoided, vaporization of the coating reactant requires high temperatures, with the possibility of premature thermal reaction of some coating reactants.

Another method of vapor deposition is described in U.S. Pat. No. 4,182,783 to Henery, wherein a solid particulate coating reactant is fluidized by introducing a volume of fluidizing gas through a mass of reactant. The fluidized mixture of coating reactant and gas is diluted with an additional volume of gas prior to delivery to the surface of the substrate to be coated. An apparatus for carrying out the technique of fluidizing a bed of solid particulate coating reactant is illustrated in U.S. Pat. No. 4,182,783 and is claimed in U.S. Pat. No. 4,297,971.

A method which avoids the health, safety and environmental problems of a solvent-based coating method, the high-temperature vaporization risks of a vapor deposition method, and the complexity of a fluidized bed powder coating method is the subject matter of the present invention.

SUMMARY OF THE INVENTION

The present invention provides a method of and apparatus for reducing a powder coating reactant to a very fine dust-like particle size, conveying the coating reactant dust in a carrier gas stream, and delivering the dust/gas smoke to a surface to be coated. Uniform dispersion of the coating reactant in the carrier gas is maintained en route to the substrate by means of a bar at the entrance of the coating chamber which creates a swirling effect in the dust/gas smoke.

DESCRIPTION OF THE DRAWING

The FIGURE illustrates the fine powder spray coating system of the present invention. Powder coating reactant, typically having an average particle size of 500 to 600 microns, is fed into a jet mill which reduces the average particle size to less than about 10 microns to produce a coating reactant with physical properties similar to the properties of dust. The coating reactant dust is dispersed in a stream of carrier gas. A swirling effect is created in the dust/gas smoke as it passes over a cylindrical rod at the entrance to the coating chamber. The uniform mixture is preferably delivered to the substrate through slot-shaped nozzles.

DESCRIPTION OF THE PREFERRED EMBODIMENTS

A substrate to be coated, preferably a sheet of glass, is maintained in a preferably horizontal position in a coating environment. In a particularly preferred embodiment, the substrate is maintained in an oxidizing atmosphere at a temperature sufficient to pyrolyze a coating reactant to deposit a metal oxide film on the surface of the substrate.

A coating reactant is obtained in the form of a powder, preferably of relatively uniform size distribution of about 500 to 600 microns or less. Coating reactants useful in accordance with the present invention include metal beta diketonates and other organic metal salts such as acetates, hexanoates, formates and so on. Organometallic compounds such as alkyl and aryl tin halides, particularly alkyltin fluorides, may also be used. Halogenated acetonates and acetylacetonates, preferably mixtures of metal acetylactonates, are preferred.

Preferably, acetylacetonate coating reactants are milled and/or sifted to obtain a relatively uniform size distribution. A powder comprising particles having an average diameter of about 500 to 600 microns or less is especially desirable. Such a powder coating reactant has physical properties similar to the properties of flour. The powder coating reaction is fed into a jet mill which effectively reduces the average particle size of the coating reactant to a dust-like 1 to 2 microns by impingement of the particles and centrifugal air forces created inside the jet mill. The coating reactant dust is fed into a stream of carrier gas, preferably air, and preferably at ambient temperature. The powder coating reactant may be injected, blown or aspirated into the carrier gas stream. While any means for mixing the fine powder coating reactant and the carrier gas is suitable, the drawing illustrates a screw-feeder.

The carrier gas may be maintained at any temperature below the decomposition temperature of the coating reactant, preferably below its vaporization temperature, and most preferably ambient temperature, thereby minimizing the risks of coating reactant decomposition which can decrease the efficiency of vapor deposition methods. The distribution of coating reactant in the carrier gas is kept substantially uniform en route to the substrate by the creation of a swirling effect in the dust/gas smoke by means of a bar, preferably a cylindrical rod although the shape is not critical, at the entrance of the coating chamber.

The uniform mixture of coating reactant and carrier gas is delivered to the surface to be coated through a slot-type nozzle, defined for purpose of the present invention as having a length substantially greater than its width. The slot is preferably no more than ⅛ inch wide, and preferably is as long as the parallel dimension of the surface to be coated to enhance the uniformity of the coating. The slot is preferably disposed perpendicular to the direction of relative motion between the nozzle and the surface to be coated. Stationary nozzles may be used to coat moving substrates or stationary substrates may be coated by traversing nozzles. The nozzle is preferably positioned less than two inches (5.1 centimeters) from the surface, more preferably about ¾ inch (1.9 centimeters) or less.

|  | % Transmittance | | % Reflectance | | | | U-Value | |
|---|---|---|---|---|---|---|---|---|
| Coating Reactant | Luminous | Total Solar Energy | Total Solar Energy | Coated Surface | Glass Surface | Shading Coefficient | Winter Night | Summer Day |
| Powder | 23 | 28 | 31 | 35.6 | 13 | 0.47 | 1.09 | 1.11 |
| Solution | 22 | 27 | 31 | 36.0 | 14 | 0.46 | 1.10 | 1.11 |

The coating reactant dust/gas smoke contacts the surface to be coated to deposit a film. Preferably, the coating reactant/carrier gas mixture contacts a glass surface at a temperature sufficient to pyrolyze the coating reactant to form a metal oxide film, typically 950° to 1050° F. (about 510° to 566° C.). In this environment, the coating reactant dust/carrier gas mixture may resemble a fog or vapor as it contacts the glass surface. Exhaust hoods may be used to draw unreacted dust away from the surface. The dust is easily recovered for reuse, thereby optimizing the efficiency of this method.

The thickness of the film may be controlled by varying the rate of relative motion between the nozzle and substrate, by adjusting the flow rate of the carrier gas/coating reactant mixture, by increasing or decreasing the concentration of coating reactant in the carrier gas or by raising or lowering the substrate temperature. The substrate may be coated in either a horizontal or vertical orientation.

The present invention will be further understood from the description of specific examples which follow.

EXAMPLE I

A mixture of cobalt, iron and chromium acetylacetonates having an average particle size of 500 to 600 microns is prepared by ball mixing of the solid, particulate coating reactants for about one hour. The coarse powder mixture is fed into a jet mill which reduces the powder mixture to a fine dust having an average particle size of about one micron or less. The fine dust is conveyed to a coating chamber using 40 pounds of intake air (75 pounds per square inch at 50 cubic feet per minute). A dowel-shaped rod at the entrance of the coating chamber causes immediate swirling of the dust/gas smoke. (If the bar is removed, air intake must be nearly doubled, resulting in poor texture of the film and requiring the use of high velocity exhaust hoods.) The coating reactant dust is delivered through a slot-shaped nozzle 27 inches (68.7 centimeters) long and ⅛ inch (0.32 centimeters) wide at a rate of about 670 milligrams per second, and contacts a 26 inch (66 centimeter) wide sheet of glass at a rate of about 16.6 feet (5.1 meters) per second. The nozzle is stationary at about ¾ inch (1.9 centimeters) above the glass surface while the glass ribbon is traveling by at a rate of 250 inches (6.35 meters) per minute at a temperature of about 1050° F. (about 566° C.). A metal oxide coating is formed having durability and spectral properties nearly identical to the properties of a coating formed from a solution of the same coating reactants. The spectral properties are compared below.

EXAMPLE II

The coating reactant composition, apparatus and operating parameters of the above example were used to deposit a film on a continuous float ribbon of ¼ inch (6 millimeter) SOLARBRONZE ® glass. The entire 27 inch (68.6 centimeter) wide coated area appears uniform in color and texture with a luminous transmittance of 21 percent and reflectance from the coated side of 37 percent. Since the rod placed at the entrance of the coating chamber allows for low air flow rates, high velocity exhaust hoods are not required; only dust collectors are used to recover undeposited coating reacting. This material may be reused without further processing.

EXAMPLE III

The coating reactant composition and operating parameters of the above examples were used in conjunction with a similar powder coating apparatus enlarged to successfully coat a 66 inch (1.7 meter) span of glass.

EXAMPLE IV

Dibutyltin difluoride powder coating reactant having an average particle size of about 500 to 600 microns is fed at a rate of 50 grams per minute into a jet mill wherein the particle size is reduced to about 1 to 2 microns. The dibutyltin difluoride dust is carried in air (50 cubic feet per minute at 75 pounds per square inch) and delivered to a glass surface through stationary double nozzles 12 inches (30.5 centimeters) long and 1/16 inch (1.6 millimeters) wide. The glass is at a temperature of 1100° to 1160° F. (about 593° to 627° C.) and traveling at a rate of 15 to 20 feet (4.6 to 6.1 meters) per minute. A clear, uniform tin oxide film having a resistivity of 20 ohms per square is formed.

The above examples are offered to illustrate the present inventions, the scope of which is defined by the following claims.

What is claimed is:

1. In a method for coating a substrate by contacting the surface of the substrate with a powder coating reactant, which comprises the steps of:
    a. dispersing the powder coating reactant into a stream of carrier gas;
    b. conveying the reactant/gas mixture to a coating chamber; and
    c. delivering the reactant/gas mixture to the surface to be coated; the improvement which comprises reducing the powder coating reactant to a fine dust having an average particle size less than about 10 microns and passing the dust/gas mixture over a bar at the entrance of the coating chamber to create a swirling smoke.

2. The method according to claim 1, wherein the particle size of the powder is reduced by jet milling.

3. The method according to claim 2, wherein the carrier gas is air.

4. The method according to claim 3, wherein the dust/gas smoke is delivered to the surface to be coated through a slot-shaped nozzle.

5. The method according to claim 3, wherein the substrate is contacted at a temperature sufficient to pyrolyze the coating reactant.

6. The method according to claim 5, wherein the coating reactant is an organometallic compound which pyrolyzes to form a metal oxide film.

7. The method according to claim 6, wherein the coating reactant is selected from the group consisting of metal acetylacetonates and alkyltin halides.

8. The method according to claim 7, wherein the substrate is glass.

* * * * *